US008042116B2

(12) United States Patent
Kurata

(10) Patent No.: US 8,042,116 B2
(45) Date of Patent: Oct. 18, 2011

(54) TASK SWITCHING BASED ON THE EXECUTION CONTROL INFORMATION HELD IN REGISTER GROUPS

(75) Inventor: Kazushi Kurata, Osaka (JP)

(73) Assignee: Panasonic Corporation, Osaka (JP)

( * ) Notice: Subject to any disclaimer, the term of this patent is extended or adjusted under 35 U.S.C. 154(b) by 923 days.

(21) Appl. No.: 11/661,273

(22) PCT Filed: Jun. 1, 2005

(86) PCT No.: PCT/JP2005/010046
§ 371 (c)(1),
(2), (4) Date: Feb. 4, 2008

(87) PCT Pub. No.: WO2006/030564
PCT Pub. Date: Mar. 23, 2006

(65) Prior Publication Data
US 2008/0256542 A1    Oct. 16, 2008

(30) Foreign Application Priority Data
Sep. 17, 2004   (JP) ................................. 2004-272096

(51) Int. Cl.
*G06F 9/46* (2006.01)
*G06F 7/38* (2006.01)
(52) U.S. Cl. ....................................... 718/107; 712/220
(58) Field of Classification Search .................. 718/107; 712/220
See application file for complete search history.

(56) References Cited

U.S. PATENT DOCUMENTS

| 5,361,337 | A  | * | 11/1994 | Okin .............................. 712/228 |
| 6,049,867 | A  | * | 4/2000  | Eickemeyer et al. ......... 712/228 |
| 6,223,279 | B1 |   | 4/2001  | Nishimura et al. |
| 6,684,342 | B1 |   | 1/2004  | Kelsey et al. |
| 6,697,935 | B1 | * | 2/2004  | Borkenhagen et al. ....... 712/228 |
| 6,931,641 | B1 | * | 8/2005  | Davis et al. ................... 718/108 |
| 2001/0047468 | A1 | * | 11/2001 | Parady .......................... 712/228 |
| 2003/0149864 | A1 |   | 8/2003  | Furukawa et al. |
| 2004/0216100 | A1 |   | 10/2004 | Bower, III |

FOREIGN PATENT DOCUMENTS

| EP | 0 373 790 A2 | 6/1990 |
| EP | 0 955 583 A2 | 11/1999 |

(Continued)

OTHER PUBLICATIONS

Konsek et al., "Context switching with multiple register windows: a RISC performance study," Report No. UIUCDCS-R-87-1377 Univ. California, Comput. Sci. Dept., Los Angeles, CA, USA, Oct. 1987, XP002505719.

(Continued)

*Primary Examiner* — Meng An
*Assistant Examiner* — Blake Kumabe
(74) *Attorney, Agent, or Firm* — McDermott Will & Emery LLP

(57) ABSTRACT

In a processor including a plurality of register groups, while a task is being executed using one of the register groups, a context of a task to be executed next is restored into another one of the register groups. If the execution of the task currently being executed is suspended before the restoration starts, the task execution is continued by using one of the register groups in which a context of a task executed previously remains and executing the task.

4 Claims, 18 Drawing Sheets

FOREIGN PATENT DOCUMENTS

| | | |
|---|---|---|
| JP | 59-146387 | 8/1984 |
| JP | 8-30562 | 2/1996 |
| JP | 10-11301 | 1/1998 |
| JP | 11-39171 | 2/1999 |
| JP | 2002-132517 | 5/2002 |
| JP | 2003-271399 | 9/2003 |

OTHER PUBLICATIONS

Supplementary European Search Report issued in Patent Application No. 05745951.3 dated on Dec. 9, 2008.

* cited by examiner

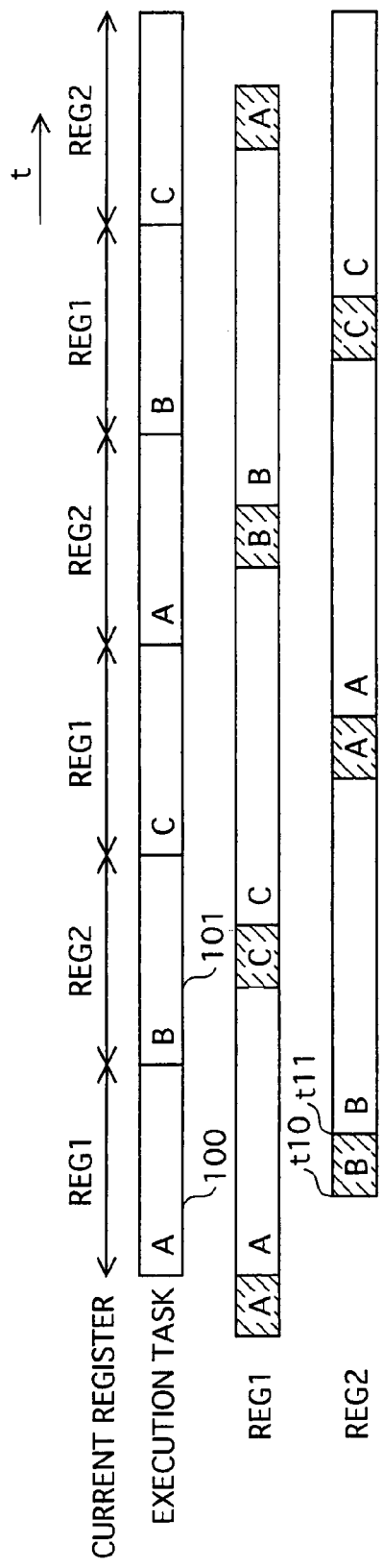
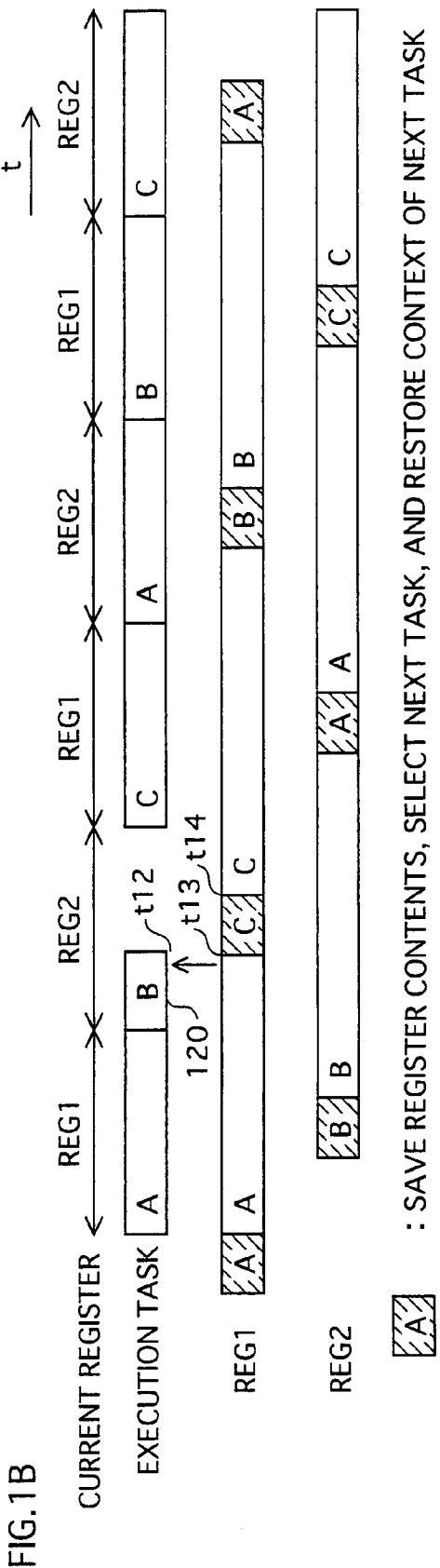
FIG.1A
FIG.1B

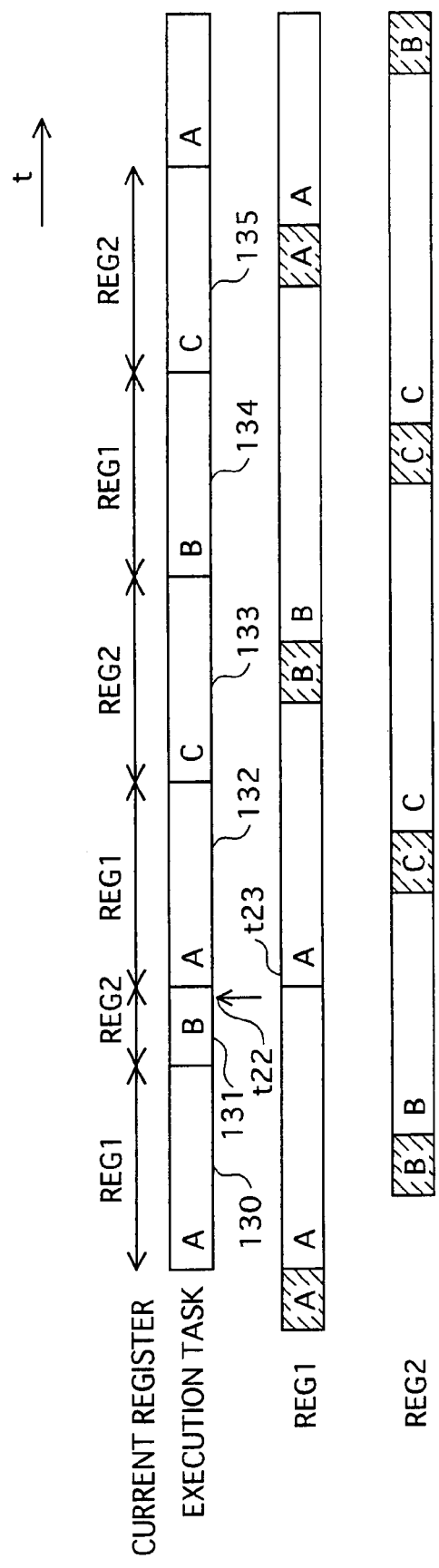

FIG.4A

| TASK CONTROL TABLE 1810 |
|---|
| PREVIOUS TASK |
| CURRENT TASK |
| NEXT TASK |

FIG.4B

| TASK ID 1821 | EXECUTION HISTORY INFORMATION 1822 | PROGRAM HISTORY 1824 |
|---|---|---|
| T0 | 010 | P0 |
| T1 | 000 | P1 |
| T2 | 100 | P2 |
| T3 | 000 | P3 |

| PROGRAM ID | SUSPENSION CAUSE INFORMATION | | | RESOLUTION TIME INFORMATION | | | PROGRAM STATUS INFORMATION |
|---|---|---|---|---|---|---|---|
| | CACHE MISS | WAITING FOR DMA | WAITING FOR EXTERNAL PROCESSING | CACHE MISS | WAITING FOR DMA | WAITING FOR EXTERNAL PROCESSING | |
| P0 | YES | NO | NO | 300 | 0 | 0 | UNDER EXECUTION |
| P1 | YES | NO | NO | 100 | 0 | 0 | UNDER SUSPENSION |
| P2 | YES | YES | YES | 150 | 200 | 100 | WAITING FOR EXECUTION |
| P3 | NO | NO | NO | 0 | 0 | 0 | WAITING FOR EXECUTION |

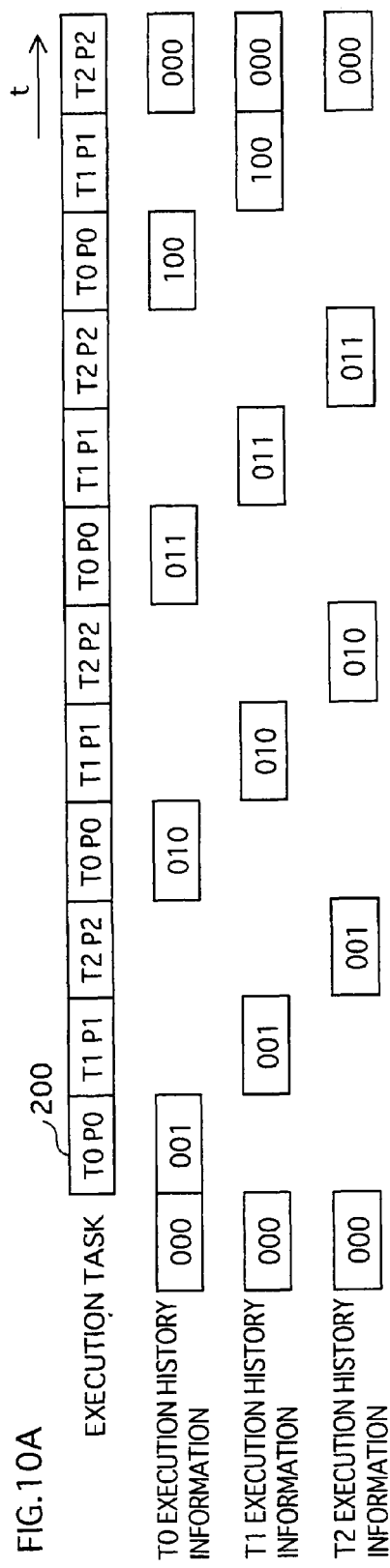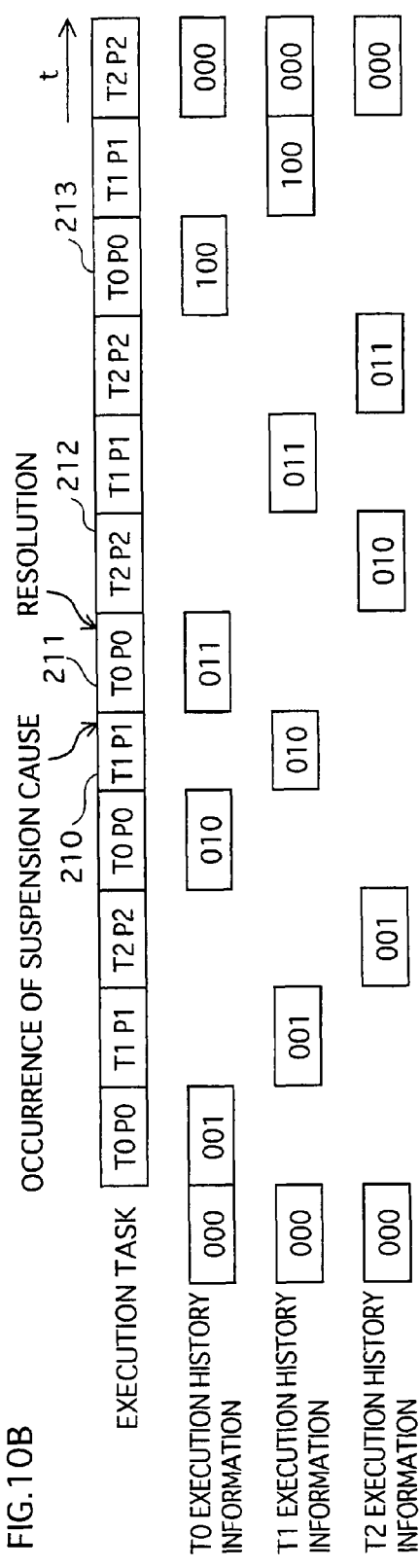

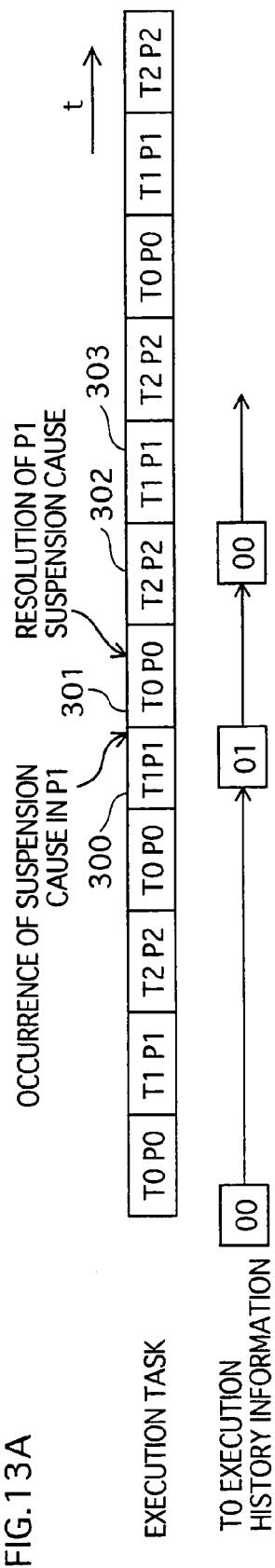
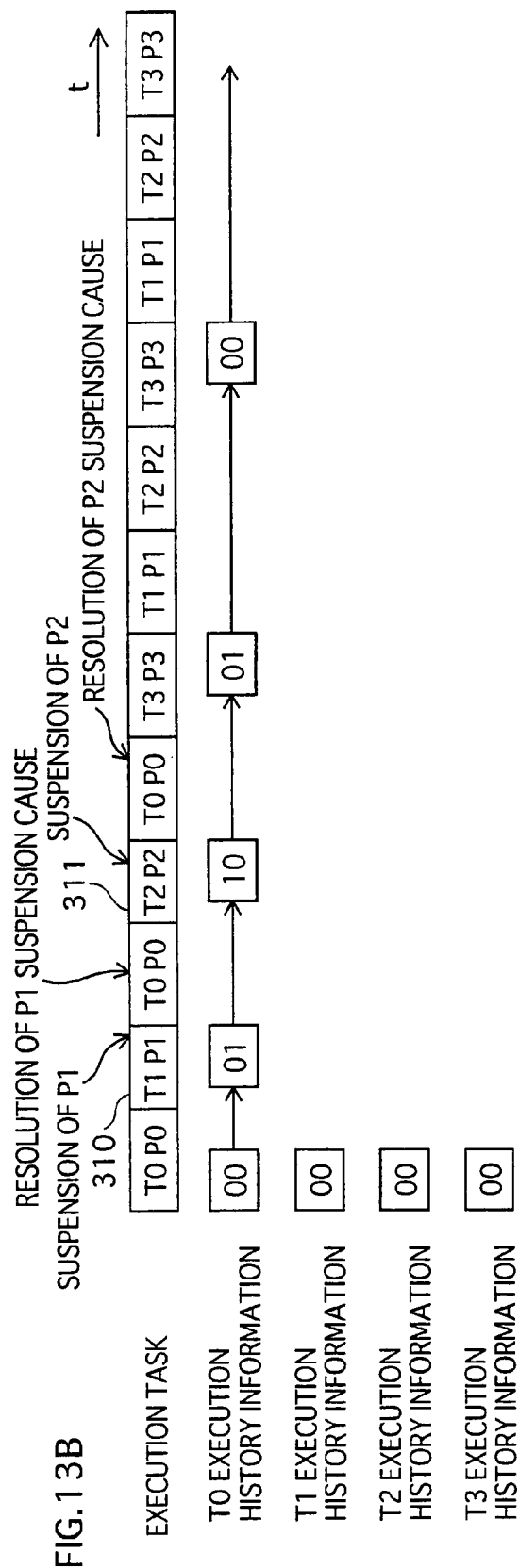

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 | 00 | P0 |
| T1 (UNDER EXECUTION) | 00 | P1 |
| T2 | 00 | P2 |

(I) SUSPENSION OF CURRENT T (T1)
(II) SET PREVIOUS T (T0) AS CURRENT T
(REPLACE CURRENT T WITH PREVIOUS T)

⇓

(2)

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 (UNDER EXECUTION) | 01 | P0 |
| T1 | 00 | P1 |
| T2 | 00 | P2 |

(I) END OF CURRENT T (T0)
(II) SET NEXT T (T2) AS CURRENT T

⇓

(3)

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 | 00 | P0 |
| T1 | 00 | P1 |
| T2 (UNDER EXECUTION) | 00 | P2 |

(I) END OF CURRENT T (T2)
(II) VALUE OF EXECUTION HISTORY
INFORMATION OF NEXT T(T0) - 1
BECAUSE OF BEING ≠ 0
(MANY TIMES EXECUTION OF T0) SET T
(T1) SUBSEQUENT TO NEXT T (T0)
AS CURRENT T

⇓

(4)

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 | 00 | P0 |
| T1 (UNDER EXECUTION) | 00 | P1 |
| T2 | 00 | P2 |

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 | 00 | P0 |
| T1 (UNDER EXECUTION) | 00 | P1 |
| T2 | 00 | P2 |

(I) SUSPENSION OF CURRENT T (T1)
(II) SET PREVIOUS T (T0) AS CURRENT T (REPLACE CURRENT T WITH PREVIOUS T)

(2)

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 (UNDER EXECUTION) | 01 | P0 |
| T1 | 00 | P1 |
| T2 | 00 | P2 |

(I) END OF CURRENT T (T0)
(II) SET NEXT T (T2) AS CURRENT T (3)

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 | 00 | P0 |
| T1 | 00 | P1 |
| T2 (UNDER EXECUTION) | 00 | P2 |

(I) SUSPENSION OF CURRENT T (T2)
((II) NORMAL PROCESSING OF SETTING NEXT T (T0) AS CURRENT T IS PERFORMED BECAUSE OF VALUE OF EXECUTION HISTORY INFORMATION OF NEXT T (T0) ≠ 0 AND PREVIOUS T BEING THE SAME (T0) AS NEXT T. SET T (T1) SUBSEQUENT TO NEXT T (T0) AS CURRENT T ( "1" IS NOT ADDED TO VALUE OF EXECUTION HISTORY INFORMATION OF PREVIOUS T (T0))

(4)

| TIMESLOT CONTROL TABLE |
|---|
| PREVIOUS T |
| CURRENT T |
| NEXT T |

| TIMESLOT | EXECUTION HISTORY INFORMATION | PROGRAM HISTORY |
|---|---|---|
| T0 (UNDER EXECUTION) | 01 | P0 |
| T1 | 00 | P0 |
| T2 | 00 | P2 |

TASK SWITCHING BASED ON THE EXECUTION CONTROL INFORMATION HELD IN REGISTER GROUPS

RELATED APPLICATIONS

This application is the U.S. National Phase under 35 U.S.C. §371 of International Application No. PCT/JP2005/010046, filed on Jun. 1, 2005, which in turn claims the benefit of Japanese Application No. 2004-272096, filed on Sep. 17, 2004, the disclosures of which Applications are incorporated by reference herein.

TECHNICAL FIELD

The present invention relates to a multitasking processor, and specifically to an art for executing tasks efficiently.

BACKGROUND ART

Multitasking means that a single computer system simultaneously executes a plurality of tasks, i.e., a plurality of processes realized by a plurality of programs. However, since a computer system having a single program execution mechanism can execute only a single task at an instant, another control mechanism such as an OS (Operating System) causes the program execution mechanism to alternately execute a plurality of tasks at extremely short intervals. This gives an illusion to users as if the plurality of tasks are executed simultaneously.

As a method for realizing this multitasking, there has been conventionally known the round robin method in which a plurality of tasks are cyclically executed in accordance with a predetermined time period allotted to each of the tasks. If a time period allotted to a task for a program execution mechanism (hereinafter "time slice") runs out, the execution of the task is temporarily suspended. Then, the order of executing the tasks is rescheduled. When a turn of the task comes again, the execution of the rest of the task is restarted.

When the execution of the task is temporarily suspended, control information (hereinafter a "context") held in various registers (hereinafter "register group") needed for the execution is stored in a memory. When the execution is restarted, the context stored in the memory is stored in the register groups and the execution is restarted from a suspended point.

Regarding this multitasking, Japanese Patent Application Publication No. 2003-271399 discloses an art for avoiding waste of a program execution mechanism to execute a plurality of tasks efficiently by performing switching between a plurality of register groups. In this art, while a task is being executed using one of the register groups, a context of a task to be executed next is stored beforehand in another one of the register groups. As soon as an execution time period allotted to the task being executed using the one register group ends, the task to be executed next is executed using the another one register group. In this way, efficiency in executing a plurality of tasks is increased.

DISCLOSURE OF THE INVENTION

The Problems the Invention is Going to Solve

However, while a task is being executed, there might occur a case where the task cannot be executed using all of an execution time period allotted thereto, i.e., a case where a cache miss and the like that results in a suspension of the execution of the task occurs during the allotted execution time period. If such a case occurs, nothing will be executed in a remaining time period of the allotted execution time period, or a task to be executed next will be executed in accordance with the scheduling set in the round robin method etc.

No execution in the remaining time period means that the processor will make the program execution mechanism idle. Also, in order to execute the task to be executed next, a case might occur where the task needs to be executed after storage of a context thereof in the register group completes. Accordingly, either case is far from efficient use of the program execution mechanism.

The present invention is made in view of the above problem relating to the suspension of task executions, and aims to provide a processor capable of executing a plurality of tasks more efficiently using a single program execution mechanism in the pseudo-parallel manner.

Means for Solving the Problem

In order to solve the above problem, the processor according to the present invention is a processor that cyclically executes a plurality of tasks in accordance with an execution time period allotted to each of the tasks, the processor comprising: a storage unit operable to store pieces of execution control information respectively corresponding to the tasks; a plurality of register groups; an execution unit operable to sequentially use one of the register groups to execute the tasks based on the execution control information held in the register group being used; a selection unit operable to select a task to be executed next among the tasks; a restoration unit operable to, while one of the tasks is being executed for an execution time period allotted thereto, restore a piece of the execution control information corresponding to the selected task into one of the register groups other than the register group being used; a detection unit operable to detect a suspension cause for the one of the tasks being executed; and a control unit operable to, (i) if the suspension cause is detected before the restoration starts, have the execution unit suspend the execution and execute one of the tasks using one of the register groups other than the register group having been used for the execution, and (ii) if the register group to be used next is the register group the restoration into which is to be started, have the restoration unit cancel the restoration.

Effect of the Invention

With the above structure, even if a task being executed needs to be suspended, the processor according to the present invention can execute a task simply by performing switching between register groups based on information of a task executed immediately before the execution of the task being suspended, the information remaining in another register group. Accordingly, a program execution mechanism can be used without waste.

Also, the storage unit may further store pieces of time information each showing a time period until a suspension cause that occurs while each of the tasks is being executed is resolved, and only if the suspension cause is detected before the restoration completes and the control unit judges that the suspension cause is resolved after the restoration completes based on a corresponding piece of the time information, the control unit may have the execution unit suspend the execution and execute one of the tasks using one of the register groups other than the register group having been used for the execution.

With the above structure, if a suspension cause occurred in a task being executed is resolved before an execution of another task starts by switching to another register group, the processor can wait for the resolution of the suspension cause. Accordingly, the program execution mechanism can be used more efficiently compared with a case where the task is executed by switching to another register group without condition.

Also, the storage unit may further store pieces of information each relating to a suspension cause that might occur while each of the tasks is being executed, the detection unit may detect a plurality of types of suspension causes, if the control unit has the execution unit suspend an execution of one of the tasks based on a detected suspension cause, the selection unit may select another one of the tasks in which a suspension cause whose type is the same as the detected suspension cause does not occur with reference to a corresponding piece of the stored information relating to the suspension cause.

With the above structure, before a suspension cause occurred in a task being executed has been resolved, a task in which a suspension cause whose type is the same as that occurred in the task being executed does not occur can be selected and executed. Accordingly, tasks can be executed within a range of capability of the program execution mechanism for processing the suspension cause. Accordingly, the program execution mechanism can be used more efficiently.

Also, the processor may further comprise a resolution detection unit operable to detect a resolution of the suspension cause, wherein the detection unit may detect a plurality of types of suspension causes, and if (i) after the execution of the task having been executed is suspended by the detected suspension cause, another one of the tasks is being executed, and (ii) another one suspension cause whose type is the same as the detected suspension cause is detected before the resolution of the suspension cause is detected, the control unit may have the execution unit suspend the execution of the another one of the tasks and execute no task until the resolution is detected.

With the above structure, if a suspension cause whose type is the same as that occurred in a task being executed occurs before the suspension cause occurred in the task being executed has been resolved, the task is not executed until the former suspension cause has been resolved. This can prevent continuous occurrence of the same type suspension causes.

In other words, while the execution of the task is being suspended, there occurs a time period where the program execution mechanism is not used. However, this can prevent excess of the processing capability of the program execution mechanism due to the continuous occurrence of the same type suspension causes.

Accordingly, the program execution mechanism can be used more efficiently as a result.

Furthermore, in a time period where the program execution mechanism is not used while the execution of the task is being suspended, clocks are not supplied. This can suppress the electrical power consumption.

BRIEF DESCRIPTION OF THE DRAWINGS

FIG. 1A is a timing diagram showing an example of a multitask execution in a processor according to the present invention, and FIG. 1B is a timing diagram showing an example where a task being executed in a conventional processor is suspended;

FIG. 2 is a timing diagram showing an example where a task having been executed in the processor is suspended;

FIG. 4A shows a structure of a task control table 1810 and an example of contents thereof, and FIG. 4B shows a structure of task information 1820 and an example of contents thereof;

FIG. 6 shows a structure of program information 1910 and an example of contents thereof;

FIG. 10 shows a transition of execution history information 1822 of a task being executed, where FIG. 10A shows an example where a suspension cause does not occur in a task being executed, and FIG. 10B shows an example where a suspension cause occurs in a task being executed;

FIG. 13 shows a transition of the execution history information 1822 in a case where the task switching processing (second method) is performed, where FIG. 13A shows a case where a suspension cause occurs once, and FIG. 13B shows a case where suspension causes occur twice;

FIG. 14 shows examples of the task control table 1810 in a case where the task switching processing (second method) is performed;

FIG. 16 shows an example of the task control table 1810 in the special case in a case where the task switching processing (second method) is performed;

Figure 3:
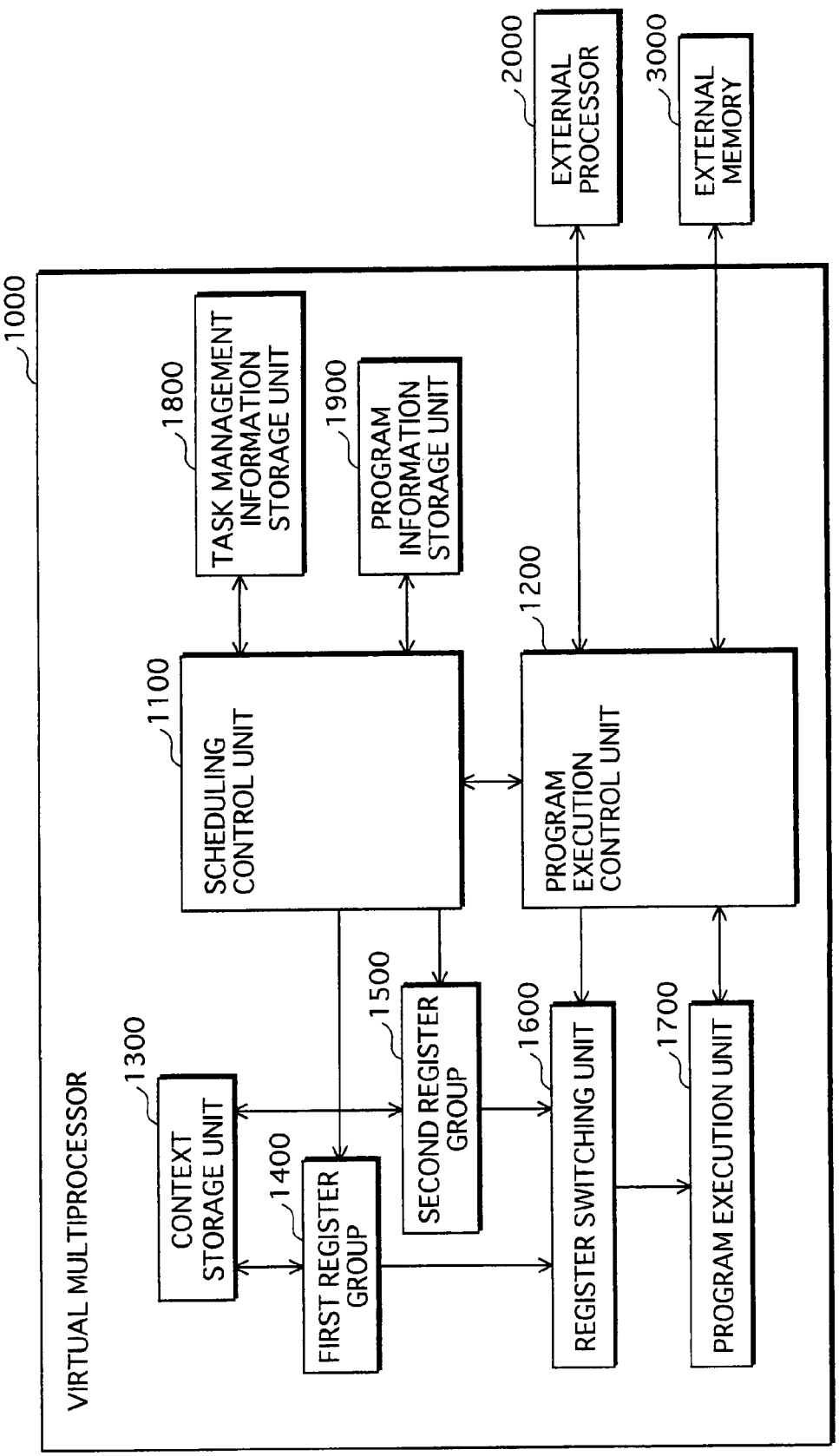
FIG. 3 is a functional block diagram showing a structure of a processor 1000 in an embodiment.

DESCRIPTION OF CHARACTERS 1000 and 1010: portable communication terminal
1100: scheduling control unit
1200: program execution control unit
1300: context storage unit
1400 and 1500: register group
1600: register switching unit
1700: program execution unit
1800: task management information storage unit
1810: task control table
1820: task information
1900: program information storage unit
1910: program information
1930: context information
2000: external processor
3000: external memory

BEST MODE FOR CARRYING OUT THE INVENTION

Embodiment

<Operation Principle of Processor>

A processor according to the present invention includes two register groups, and executes a plurality of tasks in the pseudo-parallel manner. Operations of the processor are described using FIG. 1A.

FIG. 1A is a timing diagram showing an example of a multitask execution in the processor.

The processor can switch between the two register groups and execute tasks in the same way even by using either of the two register groups.

A "current register" indicates a register currently being used for executing a task. A "REG1" and a "REG2" are the register groups included in the processor. In this example, the processor executes tasks by alternately switching between the REG1 and the REG2.

Also, an "execution task" indicates a task that is being executed using a current register. In this example, the processor cyclically executes tasks in an order of a task A, a task B, and a task C.

The REG1 and the REG2 respectively show to which task a context held therein corresponds.

For example, in a time slice 101 that is a time period allotted to a program execution mechanism, the REG2 is used as the current register to execute the task B. A context of the task B is written (hereinafter "restored") into the REG2 in a time period from a time t10 to a time t11.

This restoration is performed in a time slice 100. In other words, while executing the task A using the REG1, the processor restores the context of the task B, which is to be executed next to the task A being executed, into the register REG2 which is not being used and to be used next (Hereinafter, such a register is referred to as a "standby register".).

As described above, with an accelerated restoration of a context of a task to be executed next, the processor can efficiently execute a plurality of tasks simply by switching between registers. In other words, the processor can execute tasks without making the program execution mechanism idle.

Note that, in the time period from the time t10 to the time t11, the processor not only performs the restoration processing but also saves a context held in the register to the memory and selects a task to be executed next.

Next, a case is described using FIG. 1B where a suspension cause occurs in a task being executed and thereby the execution of the task is suspended.

FIG. 1B is a timing diagram showing an example where an execution of a task being executed in a conventional processor is suspended.

In a time slice 120, the task B is being executed in the current register. A suspension cause (shown by an arrow) occurs at a time t12, and the execution of the task B is suspended.

There are two methods to resolve this case. As one of the methods, the processor executes nothing in a remaining time period of the time slice 120. Then, when the time slice 120 ends, the processor switches to the REG1 that is a standby register to start executing the task C.

As the other method, the processor executes the task C to be executed next without waiting for the end of the time slice 120.

If the time t12 where the suspension cause occurs is later than a time t14, a context of the task C has been already restored into the REG1 that is the standby register. Therefore, the processor immediately switches to the REG1 to start executing the task C.

If the time t12 is earlier than the time t14, the processor immediately restores the context of the task C into the REG1 that is the standby register and switches to the REG1 to start executing the task C. If the time t12 is between the time t13 and the time t14, the processor starts executing the task C after restoration of the context of the task C completes.

The latter method is more efficient for executing tasks than the former method. However, if the time t12 is earlier than the time t13, the processor makes the program execution mechanism idle for a time period required for the restoration processing.

Even in such a case, that is, a task being executed is suspended by a suspension cause and a context of a task to be executed next has not been restored yet into the standby register, the processor can operate the program execution mechanism avoiding making it idle as much as possible.

An outline of operations of the processor is described using FIG. 2.

FIG. 2 is a timing diagram showing an example where a task having been executed in the processor is suspended.

If a suspension cause (shown by an arrow) occurs at a time t22 while the task B is being executed using the current register (the REG2) in a time slice 131, the processor switches to the standby register (the REG1) and executes the task A again using the REG1 as the current register. That is, the processor uses the context that remains in the standby register (REG1).

By performing switching between the registers as described above, the task B in the time slice 131 and the task A in the time slice 132 are continuously executed. Therefore, the processor does not make the program execution mechanism idle.

However, a time t22 needs to be earlier than a time t23 that is a time when restoration of a task to be executed next to the standby register (the REG1) is scheduled to be started. This is because if the time t22 is earlier than the restoration starts, the context of the task A executed previously to the task B currently being executed still remains.

Taken altogether, there are a lot of cases as described above where a suspension cause occurs before restoration of a next task to the standby register starts.

This is because it is most preferable for the processor to select a task to be executed next and restore the task immediately before switching between tasks.

This is for the following reason. To each task, a program to be executed in the task is assigned, and this program is not always executable. The probability of executability of the program increases as time advances. In other words, in most cases, the reason why the processor cannot execute the program is that the processor is waiting for data or resources. Therefore, the probability of executability of the program increases as the processor judges later.

In other words, the start of restoration of a next task is the longest in one time slice. Therefore, a probability of occurrence of a suspension cause is the highest in this time period.

Here, there is a problem that a cycle for cyclically executing tasks is disturbed. In this example, there is a possibility that the task A might be executed in preference to other tasks as a result of the disturbance of the cycle.

Generally, a task has assigned thereto a program to be executed in the task. The program is assigned in consideration of a length of a time slice of the task. In other words, if the processor needs to execute a program at a high speed or needs to ensure a time period for the execution, the processor assigns the program to a task having a longer time slice, for example.

Therefore, keeping a cycle is a precondition for assigning a program to a task.

In the processor according to the present invention, a cycle of task execution is temporarily disturbed. However, the disturbed cycle is quickly adjusted, and a consistency is maintained in view of a predetermined time width.

In the example, in a range from the time slice 130 to the time slice 135, the task A, the task B, and the task C are executed twice, respectively. This time width from the time slice 130 to the time slice 135 is extremely small compared with the whole execution time period of the program, therefore this has no influence on the execution of the program.

The following describes the processor and a method of multitask execution according to the present invention.

<Structure>

FIG. 3 is a functional block diagram showing a structure of a processor 1000 in the embodiment.

The processor 1000 includes a scheduling control unit 1100, a program execution control unit 1200, a context storage unit 1300, a first register group 1400, a second register group 1500, a register switching unit 1600, a program execution unit 1700, a task management information storage unit 1800, and a program information storage unit 1900.

The processor 1000 is composed of a plurality of integrated circuits.

FIG. 3 does not show a communication function, an interrupt function, etc. that are generally included in the processor.

First, the scheduling control unit 1100 controls an execution order of tasks. Specifically, based on information relating to the tasks stored in the context storage unit 1300 mentioned later, the scheduling control unit 1100 selects a task to be executed next. Moreover, the scheduling control unit 1100 manages time, and restores a context into a register before an execution time period allotted to each task ends.

The program execution control unit 1200 controls program execution. Specifically, upon receiving, from a program being executed, an access request to an external memory 3000 and a processing request to an external processor 2000, the program execution control unit 1200 exchanges data with the external memory 3000 and the external processor 2000. Also, the program execution control unit 1200 detects a suspension cause occurred in a program being executed. Moreover, the program execution control unit 1200 instructs the register switching unit 1600 to switch between the register groups.

The context storage unit 1300 stores a context that is control information relating to the task execution. When a plurality of tasks are being executed simultaneously, the context storage unit 1300 stores a context of each task. When a time slot of the task ends and thereby the execution of the task is temporarily suspended, this context is written from the current register. And then, when the execution of the task is restarted, the context is read to the standby register.

The first register group 1400 and the second register group 1500 are storage locations where data such as instructions, addresses, data to be operated, and results of operations are temporarily stored such that the program execution unit 1700 performs processing. Moreover, the register according to the present invention includes all registers needed for the processor to execute tasks, for example, a register whose functions are limited such as a stack register and a program counter, and a general-purpose register whose functions are not limited.

The first register group 1400 is fundamentally the same as the second register group 1500. One of these two register groups is selected by the register switching unit 1600, and a task is executed using the selected register group. This selected register group currently being used for executing the task is referred to as a current register here. On the other hand, a register group currently not being selected, i.e., a register group that is scheduled to be selected next, is referred to as a standby register here.

The program execution unit 1700 executes a program using the current register. The program execution unit 1700 is what is called the program execution mechanism, and can execute only a single program at an instant.

Next, the task management information storage unit 1800 stores statuses of a plurality of tasks being executed simultaneously.

Moreover, the program information storage unit 1900 stores information showing a status of a program assigned to a task.

In the embodiment, the task management information storage unit 1800 and the program information storage unit 1900 are storage elements that operate extremely fast.

<Data>

The following describes main data used in the processor according to the present invention using FIG. 4 to FIG. 8.

FIG. 4A shows a structure of a task control table 1810 and an example of contents thereof, and FIG. 4B shows a structure of task information 1820 and an example of contents thereof.

The task control table 1810 and the task information 1820 are stored in the task management information storage unit 1800.

The task control table 1810 shown in FIG. 4A holds pieces of information respectively showing a task currently being executed, a task to be executed next, and a task executed immediately previously.

A previous task indicates a task executed immediately previously. A current task indicates a task currently being executed. A next task indicates a task to be executed next.

Specifically, the task control table 1810 stores pieces of information indicating tasks to which the task information 1820 corresponds, for example, index values, addresses, etc.

Each time one time slice ends, the task stored in the task control table 1810 is rewritten by the scheduling control unit 1100. The tasks are basically rewritten in the following way.

When an execution of a current task being executed ends, the scheduling control unit 1100 sets the current task as a new previous task, sets a next task as a new current task, and sets a task next to the new current task as a new next task.

Next, the task information 1820 shown in FIG. 4B is composed of a task ID 1821, execution history information 1822, and a program history 1824.

The task ID 1821 is an identifier of a task, and specific to the task. In this example, the task ID 1821 is shown as "T0", etc.

Moreover, the tasks are executed in the order of the arranged tasks in the task information 1820. In this example, a task with a task ID "T0" is firstly executed, and then a task with a task ID "T1", a task with a task ID "T2", and a task with a task ID "T3" are executed in rotation.

The execution history information 1822 is a history that shows the number of times a time slice of each of the tasks has been executed.

The execution history information 1822 is composed of three bit-data. An initial value of the execution history information 1822 is "000". Each time a time slice is executed once, "1" is added to the value of the execution history information 1822. The value increase as follows: "001", "010", "100", and "000".

The execution history information 1822 is set up by the scheduling control unit 1100 based on a property of a program assigned to each task, a status of execution thereof, and so on. Accordingly, the execution history information 1822 does not always show the same value. Moreover, four tasks are described in this example for convenience. However, the number of tasks is not limited to four, of course.

The program history 1824 shows a program assigned to each task. For example, a program assigned to the task with the task ID "T0" is expressed with "P0". In the embodiment, the tasks and the programs are described as one-to-one corresponding to each other. However, the following may be also employed: there are a plurality of programs as candidates of a program to be assigned to a task, and the most appropriate program is selected among the candidates and is assigned to the task in accordance with a situation.

Figure 5:
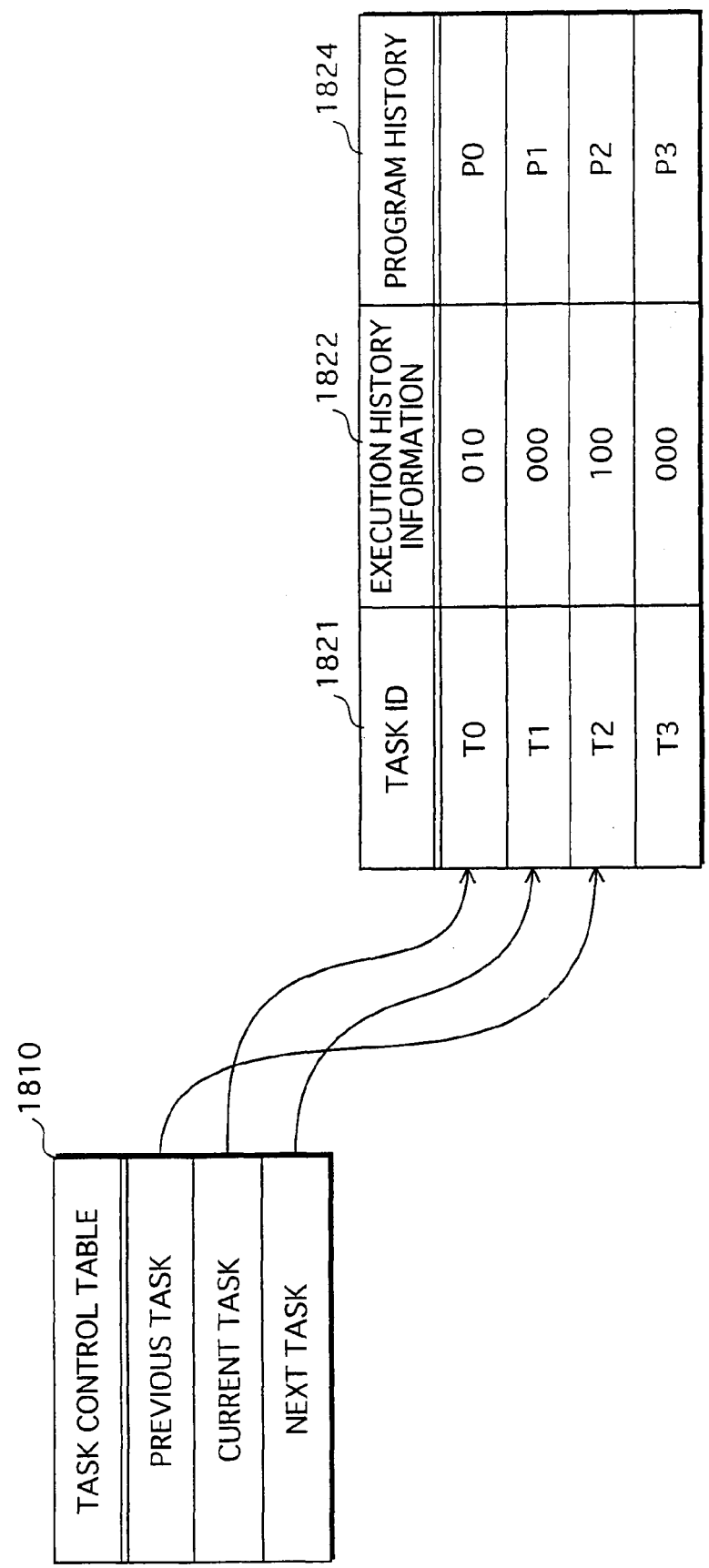
FIG. 5 shows an example of a correspondence between the task control table 1810 and the task information 1820.

FIG. 5 shows an example of a correspondence between the task control table 1810 and the task information 1820.

In this example, a previous task held in the task control table 1810 corresponds to the task with the task ID 1821 held in the task information 1820 "T2". In the same way, the current task corresponds to the task with the task ID 1821 "T0", and the next task corresponds to the task with the task ID 1821 "T1".

This indicates that a task currently being executed is the task "T0", a task executed immediately previously is the task "T2", and a task to be executed next to the task being executed "T0" is the task "T1". The scheduling control unit 1100 refers to this pointer in order to select a task to be executed next. Also, each time a task to be executed changes, the scheduling control unit 1100 rewrites the pointer.

Next, FIG. 6 shows a structure of the program information 1910 and an example of contents thereof.

The program information 1910 is stored in the program information storage unit 1900.

The program information 1910 is composed of a program ID 1911, suspension cause information 1912, resolution time information 1913, and program status information 1914.

The program ID 1911 is identification information of a program. A value shown by the program ID 1911 is a value shown by the program history 1824 of the task information 1820.

The suspension cause information 1912 shows suspension causes that may occur while a program with the program ID 1911 is being executed.

The suspension cause indicates a cause that inevitably causes a suspension of an execution of a task being executed. In the embodiment, the suspension cause includes three causes: a cause "cache miss"; a cause "waiting for DMA"; and a cause "waiting for external processing".

The cause "cache miss" indicates a situation where although a cache is accessed, a required data cannot be found, and it takes a time period to read the data from hard disks, etc.

The cause "waiting for DMA" indicates a situation where there occurs a time period for exchanging data between the memory and each device. Note that the DMA (Direct Memory Access) indicates a method for exchanging data between the memory and each device not via the program execution unit 1700 that is the program execution mechanism.

The reason "waiting for external processing" indicates a situation where when data which needs to be processed by the external processor 2000 occurs while a program is being executed, and the processor requests the external processor 2000 to perform the processing and waits for the processing to be performed, or a situation where when such data occurs, the completion of the processing performed by the external processor is late and data is suspended and therefore the processor waits for the data from the external processor.

Next, the resolution time information 1913 shows an expected time period needed for a suspension cause to be resolved. The resolution time information 1913 shows a time period needed for a suspension cause to be resolved, which is shown as "YES" by the suspension cause information 1912. The resolution time information 1913 is set up beforehand.

For example, a program with the program ID 1911 "P1" has a possibility that the suspension cause "cache miss" might occur while the program is being executed. The suspension cause is expected to be resolved in "100" clocks.

The program status information 1914 shows a status of a program, such as whether the program is executable or not. In the embodiment, the status includes three statuses: a status "under execution"; a status "waiting for execution"; and a status "under suspension".

The status "under execution" indicates a status where a program is being executed. The status "waiting for execution" indicates a status where preparation for executing a program has completed, and the program is waiting for its execution turn. Also, the status "under suspension" indicates a status where the preparation for the executing the program has not completed yet.

Figure 7:
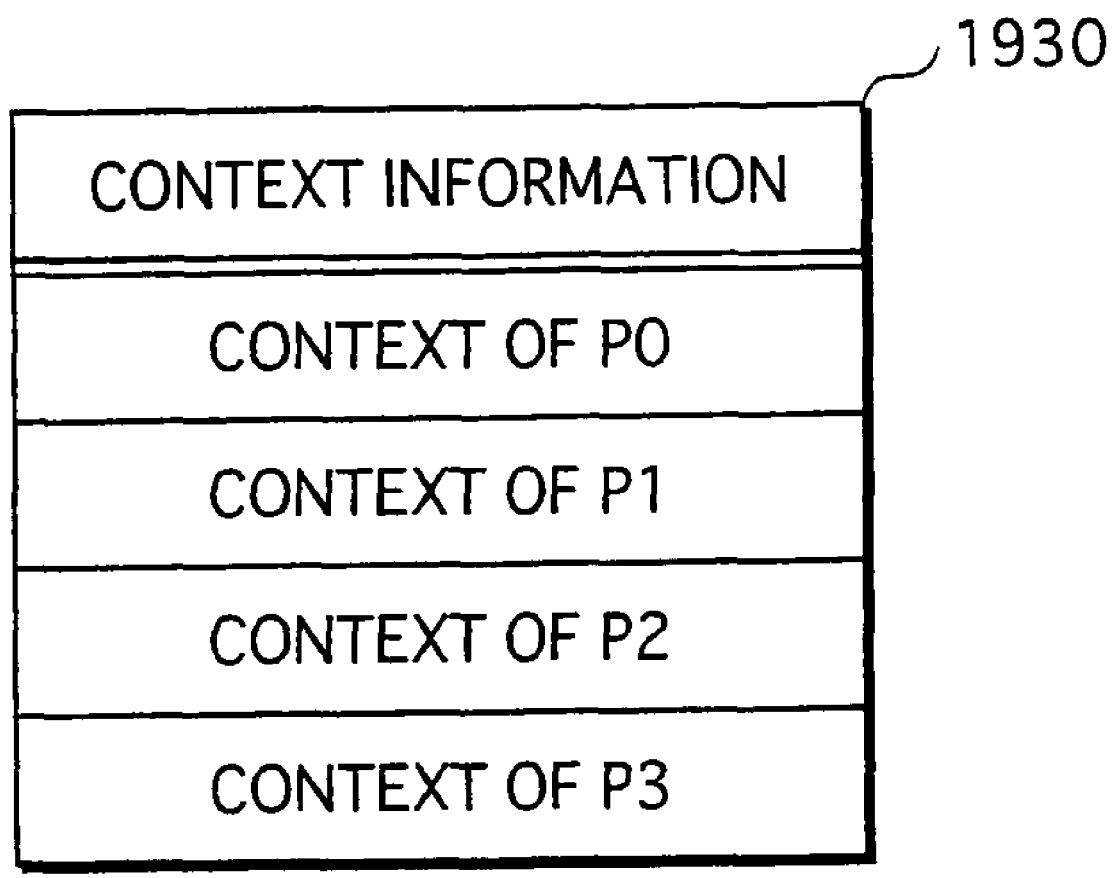
FIG. 7 shows a structure of context information 1930 and an example of contents thereof.

FIG. 7 shows a structure of context information 1930 and an example of contents thereof.

The context information 1930 is stored in the program information storage unit 1900.

There is a storage region of a context for each program, and the context is stored in a storage region corresponding to the program. When an execution of a program is suspended, a content of a current register group is overwritten on a context region of the program. Also, when the program is executed again, the context stored in the context region of the program to be executed is read, and is written to the standby register. These processing is performed by the scheduling control unit 1100.

<Operations>

The following describes the above-described operations of the processor 100 using FIG. 8 to FIG. 16.

Here, processing for switching to a task to be executed, i.e., processing for selecting a task to be executed next is described. Other processing for executing tasks is the same in that in general processors (See Japanese Patent Application Publication No. 2003-271399).

The flow chart showing task switching processing for addressing two cases including a case where a suspension cause occurs in a task being executed using a current register, and a case where a task is being executed as scheduled.

In the embodiment, two methods are described as methods for the task switching processing.

In both two methods, the task switching processing is performed using the execution history information 1822 of the task information 1820 (See FIG. 4B).

First, a first method is described.

<First Method>

In the first method, the execution history information 1822 of the task information 1820 is used as a counter of a time slice where a program is executed.

Figure 8:
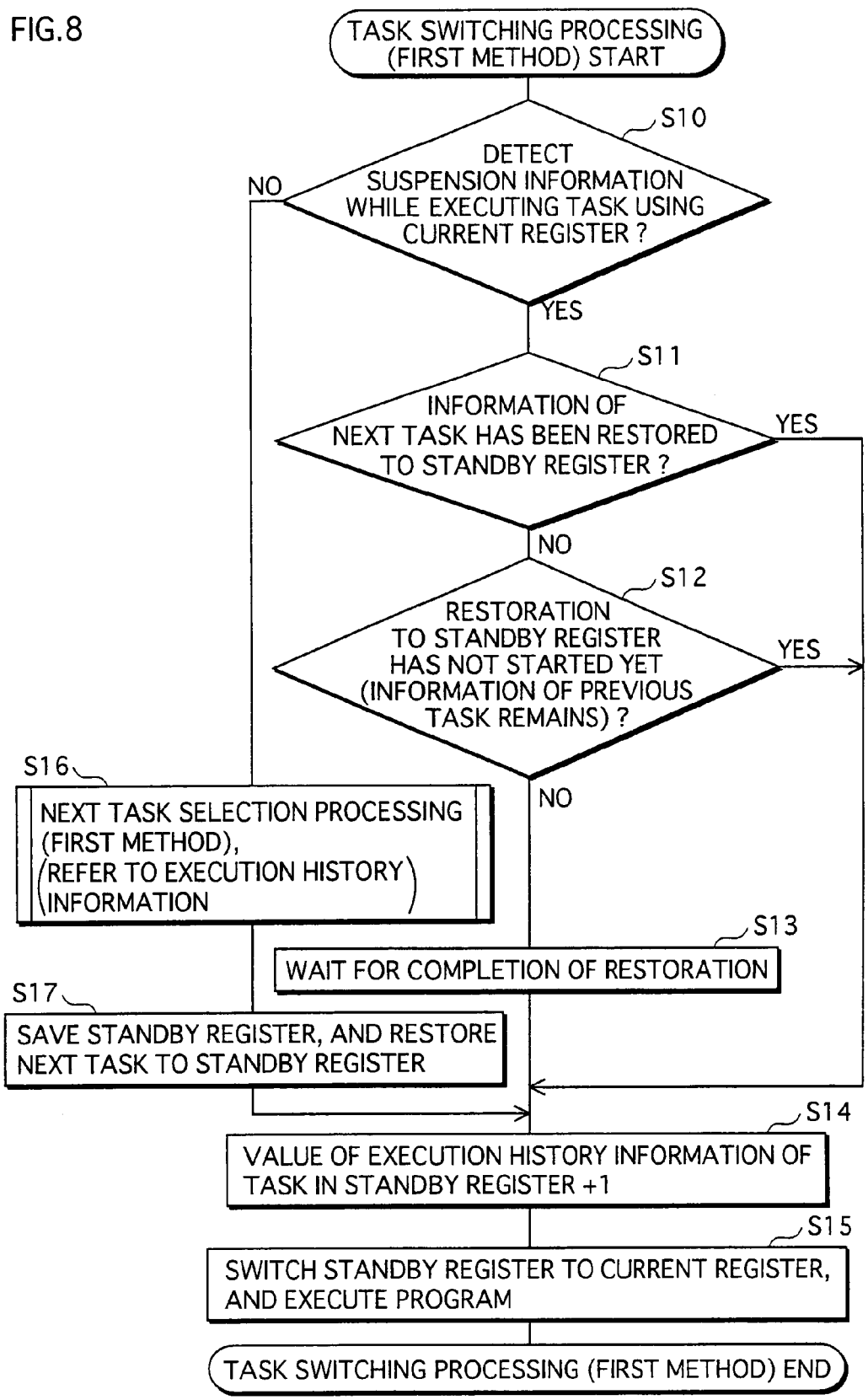
FIG. 8 is a flow chart showing task switching processing (first method)

FIG. 8 is a flow chart showing task switching processing (first method).

FIG. 8 is described using FIG. 10. FIG. 10 shows a transition of the execution history information 1822 while a task is being executed. In FIG. 10, an example is shown where three tasks are executed.

FIG. 10A shows an example where a suspension cause does not occur in a task being executed.

Tasks are cyclically executed in an order of "T0", "T1", and "T2". For example, at first, pieces of the execution history information 1822 of the tasks respectively show "000". In a time slice 200, the task "T0", i.e., the program "P0" is executed, "1" is added to a value shown by the execution history information 1822 of the task "T0", and therefore the value shown by the execution history information 1822 is "001". In FIG. 10, the execution history information 1822 is described only when there occurs a change, for convenience.

Then, each time each task is executed in order, "1" is added to a value shown by the execution history information 1822 corresponding to the task.

FIG. 10B shows an example where a suspension cause occurs in a task being executed.

The operations are described using FIG. 10B. Also, a program assigned to the task is waiting for to be executed.

First, in a time slice 210, the program execution unit 1700 executes the program "P1" assigned to the task "T1" using the current register (here, the first register group 1400 is used).

The program "P1" accesses the external memory 3000 to read data through the program execution control unit 1200. However, a suspension cause "cache miss" occurs in the program "P1", and the external memory 3000 notifies the program execution control unit 1200 of the occurrence of the suspension cause.

Upon receiving the notification of the occurrence of the suspension cause, the program execution control unit 1200 requests the scheduling control unit 1100 to perform task switching processing.

Upon receiving the request for the task switching processing, the scheduling control unit 1100 judges that this request is a request for a case where a suspension cause occurs (Step S10: YES). The scheduling control unit 1100 judges whether a context of a next task "T2" has been already restored into the standby register the "second register group" (Step S11).

The scheduling control unit 1100 can judge that this request is a request for the case where a suspension cause occurs because the scheduling control unit 1100 performs time management. If receiving this request before the end of the time slice where the program is being executed, the scheduling control unit 1100 judges that this request is a request due to an occurrence of a suspension cause. Also, the scheduling control unit 1100 performs the restoration processing, and therefore can judge whether the restoration processing is currently being performed or not.

Note that, concerning a timing of the occurrence of the suspension cause in the task "T1" in the time slice 210 is at a time when restoration processing of a next task has not started yet (hereinafter, same as the above timing if there is no special description).

Therefore, the scheduling control unit 1100 judges that the context of the next task "T2" has not been restored into the standby register the "second register group" (Step S11: NO) and the restoration processing has not been started (Step S12: YES). So, the scheduling control unit 1100 proceeds to processing for executing the context remaining in the standby register the "second register group", i.e., the task "T0".

The scheduling control unit 1100 adds "1" to the value shown by the execution history information 1822 of the program "P0" assigned to the task "T0" prepared in the standby register, and the value shown by the execution history information 1822 is "011" (Step S14). Then, the scheduling control unit 1100 notifies the program execution control unit 1200 of completion of the task switching processing.

Upon receiving the notification of the completion of the task switching processing, the program execution control unit 1200 notifies the register switching unit 1600 of switching the standby register the "second register group" to the current register, in order to execute a task using the standby register the "second register group". Subsequently, the program execution control unit 1200 notifies the program execution unit 1700 of start of the execution. Then, the execution of the task "T0" starts (Step S15).

In this way, the task "T0" is executed in the time slice 211.

In addition, if the context of the next task "T2" has been already restored into the standby register the "second register group" (Step S11: YES), the scheduling control unit 1100 proceeds to processing for executing a context that has been already restored into the standby register the "second register group", i.e., the task "T2".

Also, if the context of the next task "T2" has not been restored into the standby register the "second register group" (Step S11: NO) and is currently being restored (Step S12: NO), the scheduling control unit 1100 waits for completion of the restoration of the context of the next task "T2" (Step S13), and proceeds to processing for executing a context that has been already restored into the standby register the "second register group", i.e., the next task "T2".

Next, a method for selecting a task to be executed in a time slice 212 is described.

Before the end of the time slice 211, the scheduling control unit 1100 performs the task switching processing.

Since the task switching processing is switching processing for a case where the time slice is run out (Step S10: NO), the scheduling control unit 1100 performs the processing for selecting a task to be executed next (Step S16).

Figure 9:
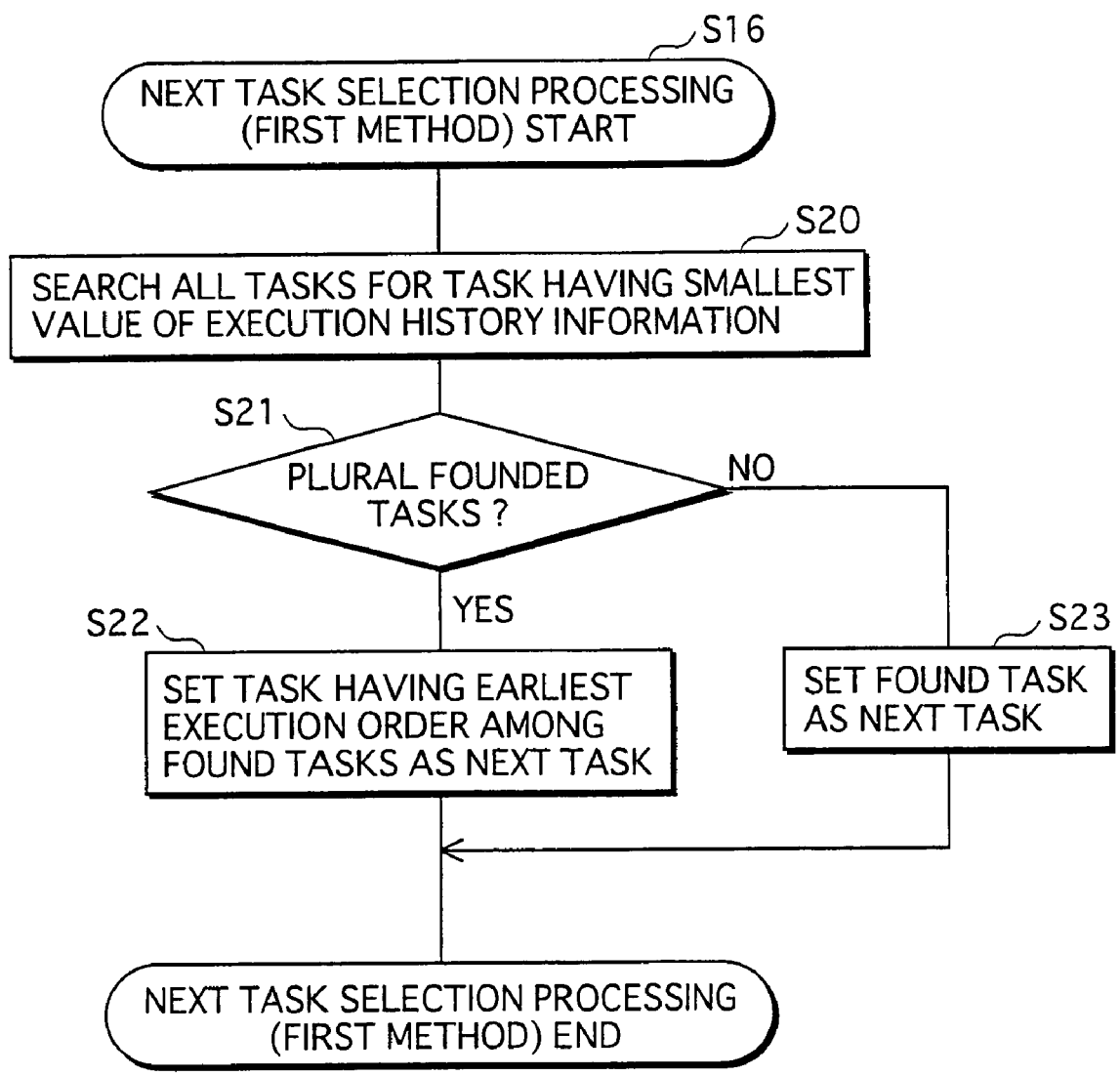
FIG. 9 is a flow chart showing next task selection processing (first method)

The next task selection processing is described in detail using FIG. 9.

FIG. 9 is a flow chart showing next task selection processing (first method).

When selecting a task to be executed next, the scheduling control unit 1100 searches the execution history information 1822 of the task information 1820 to select a task having a smallest value shown by the execution history information 1822 (Step S20).

If the number of found tasks is one (Step S21: NO), the scheduling control unit 1100 determines the found task as a task to be executed next (Step S23).

Moreover, if there are a plurality of found tasks (Step S21: YES), the scheduling control unit 1100 determines a task having an earliest execution order among the found tasks as a task to be executed next (Step S22).

In this example, in the time slice 211, the scheduling control unit 1100 selects a task to be executed in the time slice 212. Therefore, the task "T2" is searched for in Step S20.

Also, the number of tasks searched for is one, therefore, a task to be executed next is the task "T2".

The scheduling control unit 1100 selects the next task "T2", and overwrites a context held in the standby register the "first register group", i.e., the context of the program "P0" executed in the task "T0" on a context region of the program "P0" of the context information 1930 stored in the task management information storage unit 1800, that is, saves the context. Then, the scheduling control unit 1100 reads the context of the program "P2" to be executed in the task to be executed next "T2" from the context information 1930 to the standby register the "first register group", that is, restores the context (Step S17).

Then, the scheduling control unit 1100 performs processing for executing the task "T2" using the context held in the standby register the "first register group" (Step S14 and Step S15).

In this way, the task "T2" is executed in the time slice 212.

If a suspension cause does not occur after this, when the task "T0" is executed in a time slice 213, the accelerated execution of the task "T0" in the time slice 211 is balanced out, and the execution time periods between tasks is ensured.

<Second Method>

Next, a second method for task switching processing is described.

In the first method, the scheduling control unit 1100 uses the execution history information 1822 of the task information 1820 as a counter of the time slice where the task is executed. Compared the first method, in the second method, the execution history information 1822 is used as a counter of a time slice where a task is unexpectedly executed in advance.

Figure 11:
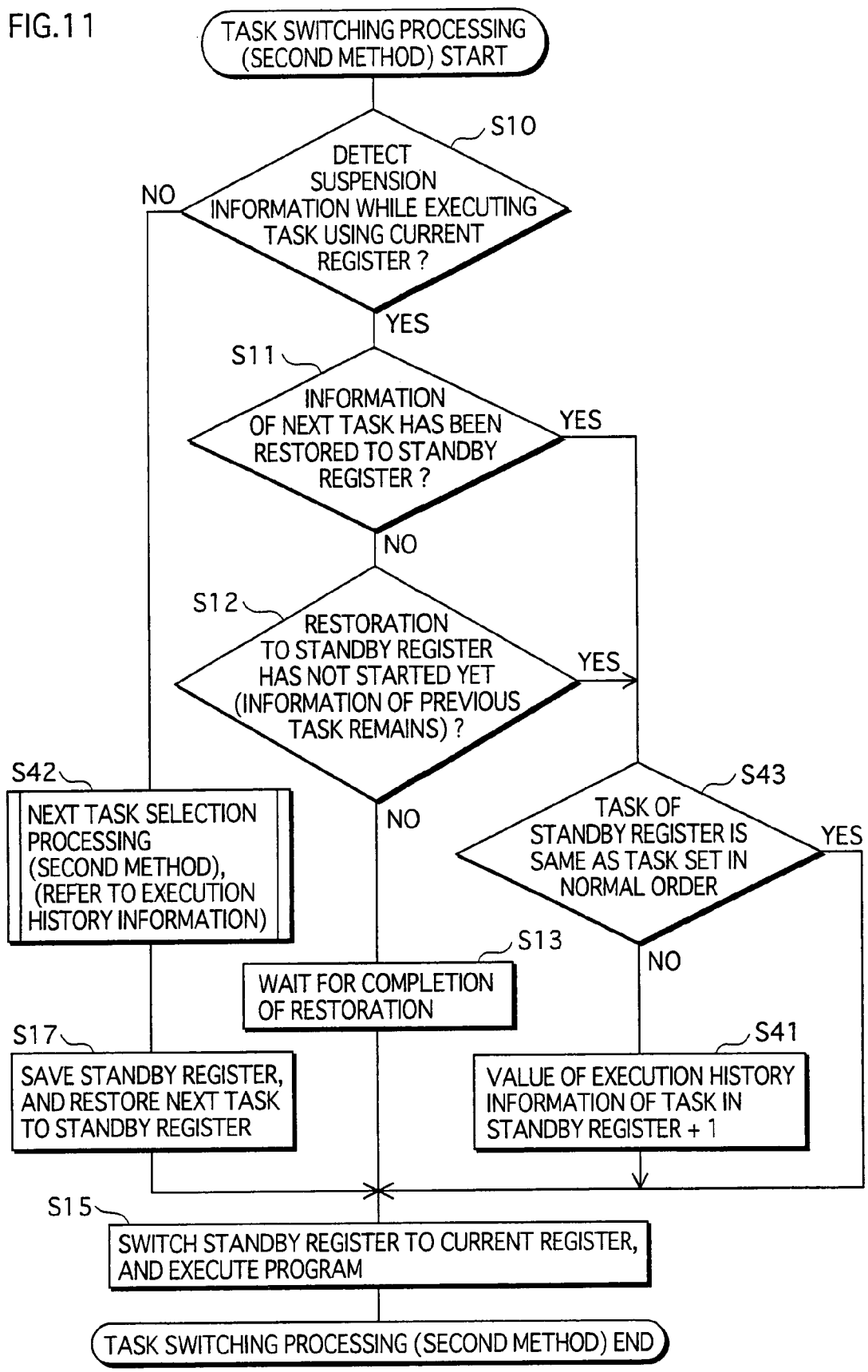
FIG. 11 is a flow chart showing task switching processing (second method)

FIG. 11 is a flow chart showing the task switching processing (second method).

FIG. 11 is described using FIG. 13. FIG. 13 shows a transition of the execution history information 1822 while a task is being executed, where FIG. 13A shows an example where a suspension cause occurs once, and FIG. 13B shows suspension causes occur continuously. In FIG. 13B, the transition is described using four tasks for convenience.

The task switching processing (second method) shown in FIG. 11 is described focusing on a difference with the task switching processing (first method) shown in FIG. 8.

Processing in Step 10 to Step 12 in FIG. 11 is the same as that in FIG. 8.

The program execution control unit 1200 finds an occurrence of a suspension cause while the task "T1" is being executed in a time slice 300, and requests the scheduling control unit 1100 to perform the task switching processing.

Upon receiving the request, the scheduling control unit 1100 judges that this request is a request for a case where a suspension cause occurs (Step S10: YES), and proceeds to processing for executing a task using the context of the task executed previously "T0" remaining in the standby register the "second register group" (Step 11:YES and Step 12:YES).

Processing in Step 43 is a special case, and therefore is described later using FIG. 15 and FIG. 16. Normally, the processing in Step 43 branches to "NO".

The scheduling control unit 1100 adds "1" to the value shown by the execution history information 1822 of the program "P0" assigned to the task "T0" prepared in the standby register, and therefore the execution history information 1822 is "01" (Step S41) (See FIG. 13A). Then, the scheduling control unit 1100 notifies the program execution control unit 1200 of completion of the task switching processing.

Upon receiving the notification, the program execution control unit 1200 switches to another register to execute a program (Step S15).

Different from the task switching processing (first method) shown in FIG. 9, in the task switching processing (second method), only if a task is executed using a context of a task executed immediately previously remaining in the standby register, the program execution control unit 1200 adds "1" to the value shown by the execution history information 1822.

In accordance with this difference, next task selection processing in the task switching processing (second method) in a case where a normal time slice completes is different from that in the task switching processing (first method) (Step S42).

Figure 12:
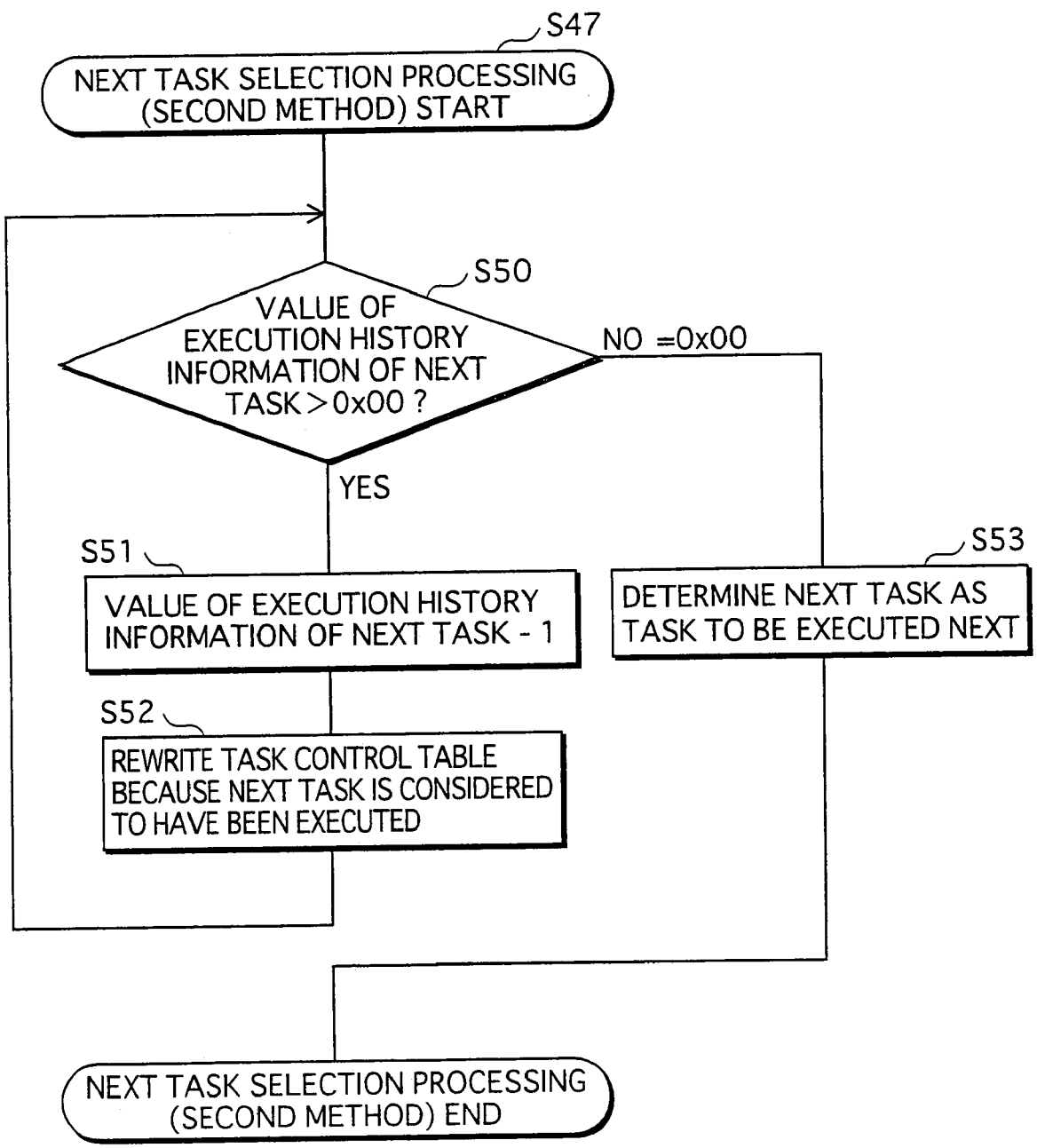
FIG. 12 is a flow chart showing next task selection processing (second method)

The next task selection processing (second method) is described using FIG. 12 to FIG. 14.

First, FIG. 12 is described using FIG. 13.

FIG. 12 is a flow chart showing the next task selection processing (second method). FIG. 13 shows a transition of the execution history information 1822 in the case where the next task selection processing (second method) is performed.

When selecting a task to be executed next, the scheduling control unit 1100 searches the execution history information 1822 of a task shown by a next task in the task control table 1810. If a value shown by the execution history information 1822 is zero (0x00), that is, if the task has not been executed in advance (Step S50: NO), the scheduling control unit 1100 determines the next task as a task to be executed next (Step S53).

If the value shown by the execution history information 1822 is greater than zero (0x00), that is, if the task has been executed in advance at least once (Step S50: YES), the scheduling control unit 1100 subtracts "1" from the value shown by the execution history information 1822 of the task (Step S51). In other words, the scheduling control unit 1100 performs processing for subtracting one from the number of extra task executions in advance in order to skip a one-time task execution.

Then, the scheduling control unit 1100 updates the contents of the task control table 1810 because the next task is considered to have been executed. That is, the scheduling control unit 1100 determines a task next to a present next task as a current task, a task next to the current task as a next task, and a present current task as a previous task (Step S52).

And the scheduling control unit 1100 repeats the processing from Step 50 to Step 52. If there appears a task whose value shown by the execution history information 1822 is zero, the scheduling control unit 1100 determines the task as a task to be executed next (Step S53).

In this example, a task of to be executed next to the task being executed "T2" in a time slice 302 is the task "T0". However, a value shown by the execution history information 1822 of the task "T0" is "01", the scheduling control unit 1100 subtracts "1" from the value shown by the execution history information 1822 so as to be "00", and skips this execution of the task "T0". Therefore, in a time slice 303, not the task "T0" but the task "T1" is executed.

A transition of the execution history information 1822 and the task control table 1810 in a case where the task switching processing (second method) is performed is described using FIG. 13 and FIG. 14. FIG. 14 shows examples of the task control table 1810 in the task switching processing (second method).

In FIG. 13A, an execution of the task "T1" being executed in the time slice 300 is suspended, and the task "T0" executed immediately previously is being executed in a time slice 301.

FIG. 14(1) shows an example where the task "T1" is being executed. Then, if the execution of the task "T1" is suspended and the task "T0" is executed, a previous task is replaced with a current task, and this is shown in FIG. 14(2).

At this time, "1" is added to a value shown by the execution history information 1822 of the task "T0" so as to be "01".

Then, in the time slice 302, the next task "T2" becomes a current task, and is executed. The task control table 1810 at this time is shown in FIG. 14(3).

When the execution of the task "T2" completes, the scheduling control unit 1100 performs skipping processing, i.e., subtracts "1" from the value shown by the execution history information 1822 of the task "T0", and switches the current task to the task "T1" next to the task "T0". This is because the value shown by the execution history information 1822 of the next task "T0" that should be a next task is not zero (See Step 50 in FIG. 12). The task control table 1810 at this time is shown in FIG. 14(4).

In a time slice 303, the task "T1" is being executed and the value shown by the execution history information 1822 of the task "T0" is "00".

FIG. 13B shows an example where a suspension of task executions occurs a plurality of times. In this case, the number of tasks executed in parallel is four for convenience.

Due to suspension of an execution of the task "T1" being executed in a time slice 310, the task "T0" is executed in advance and the value shown by the execution history information 1822 of the task "T0" is "01". Also, due to suspension of an execution of the task "T2" being executed in a time slice 311, the task "T0" is executed in advance again and the value shown by the execution history information 1822 of the task "T0" is "10".

Then, the value shown by the execution history information 1822 of the task "T0" gradually returns to "00" as the number of task executions increases. That is, at a time when the value shown by the execution history information 1822 of the task "T0" becomes "00", the number of the time slices where the tasks are executed returns to the scheduled number.

Figure 15:
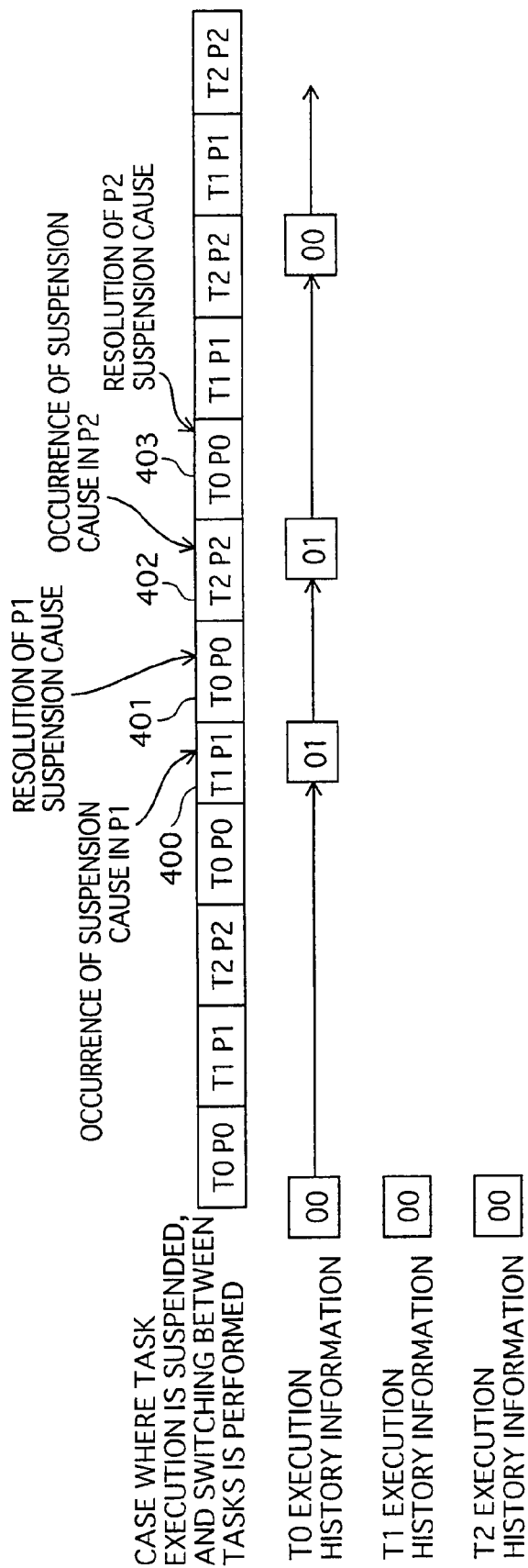
FIG. 15 shows a transition of the execution history information 1822 in a special case in a case where the task switching processing (second method) is performed.

Next, Step S43 shown in FIG. 11 is described using FIG. 15 and FIG. 16.

Step S43 is processing performed in a case where suspension of task execution occurs continuously twice, i.e., a case where a previous task is executed continuously twice. The example shown in FIG. 13B is the same as that shown in FIG. 15 except that the number of tasks executed in the pseudo-parallel manner is three in the example shown in FIG. 15. A method is described here for addressing the special case that might occur depending on the number of tasks executed in the pseudo-parallel manner, the number of suspension counts, etc.

FIG. 15 shows a transition of the execution history information 1822 in a case where the task switching processing (second method) is performed. FIG. 16 shows an example of the task control table 1810 in a case where the task switching processing (second method) is performed.

In FIG. 15, an execution of the task "T1" being executed in a time slice 400 is suspended, and the task "T0" executed immediately previously is being executed in a time slice 401.

FIG. 16(1) shows an example where the task "T1" is being executed. If the execution of the task "T1" is suspended and the task "T0" is executed, the scheduling control unit 1100 replaces a previous task with a current task. This is shown in FIG. 16(2).

At this time, "1" is added to a value shown by the execution history information 1822 of the task "T0", and therefore the value shown by the execution history information 1822 of the task "T0" is "01".

Then, in a time slice 402, a next task "T2" is replaced to the current task and is executed. The task control table 1810 at this time is as shown in FIG. 16(3).

A suspension cause occurs while the task "T2" is being executed. The scheduling control unit 1100 should execute the previous task "T0" as the current task. However, if the suspension cause does not occur in the task "T2" at this time, a task to be executed next to the task "T2", i.e., a next task, is the task "T0", too. That is, the task to be executed due to the occurrence of the suspension cause and the task to be executed next in accordance with the normal order is the same task.

Therefore, in this case, the processing is performed in the same way as the normal processing without changing the execution history information 1822. This judgment processing is shown as Step S43 in FIG. 11. If the task to be executed due to the occurrence of the suspension cause, i.e., a task in the standby register, and the task to be executed in accordance with the normal order is the same task (Step S43: YES), the scheduling control unit 1100 executes the task by switching the standby register to the current register.

Although the task "T0" is being executed in a time slice 403, a value shown by the execution history information 1822 of the task "T0" is still "01". The task control table 1810 at this time is as shown in FIG. 16(4).

First Modification Example

<Outline>

In a first modification example, if a suspension cause occurs, in order to execute a task using a context remaining in a standby register, an occurrence of a suspension cause that is the same as the suspension cause being occurred is prevented. This is because there is a limit in a capability for resolving suspension causes. Accordingly, if same suspension causes occur continuously, resolution of the suspension causes might take a long time more than expected.

<Operations>

Figure 17:
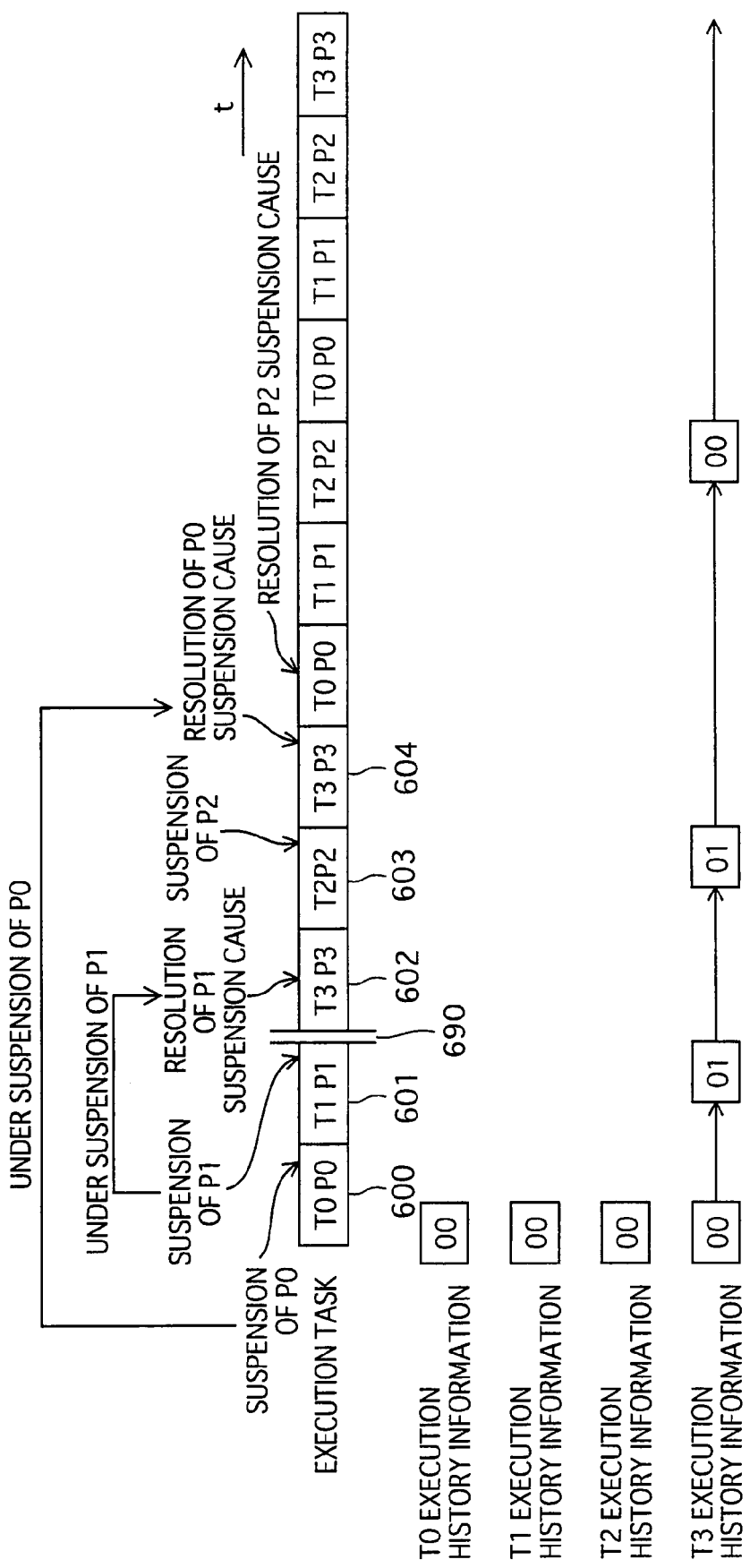
FIG. 17 shows a transition of an execution task and the execution history information 1822 in a case where a task is not selected in which a suspension cause whose type is the same as that occurred in the task being executed occurs.

An example is described where a task in which same suspension causes do not continuously occur, using the transition diagram shown in FIG. 17 and the program information 1910 shown in FIG. 6.

FIG. 17 shows a transition of an execution task and execution history information 1822 in a case where a suspension cause occurs while a task is being executed.

In the first modification example, if a suspension cause occurs, the scheduling control unit 1100 rewrites a status shown by the program status information 1914 of a program assigned to a task that is being executed with "being suspended". Moreover, the scheduling control unit 1100 stores the suspension cause in an internal memory (not shown), and leaves only a newest suspension cause. If the suspension cause is resolved, the scheduling control unit 1100 rewrites the status shown by the program status information 1914 with "the waiting for execution".

Moreover, with reference to the program information 1910 corresponding to a program assigned to a task, the scheduling control unit 1100 prevents a continuous occurrence of the suspension causes by selecting, as a program to be executed next, a program whose status shown by the program status information 1914 is "waiting for execution" and in which a suspension cause as the same as that stored in the suspension cause information 1912 is not occurred.

A specific example of the above case is described.

While the task "T0" is being executed in a time slice 600, a suspension cause occurs. And the execution of the task "T0" is suspended. A status shown by the program status information 1914 of the program "P0" becomes "being suspended", and the suspension cause is stored. The suspension cause in this example is the "cache miss".

Then, while the task "T1" is executed in a time slice 601, a suspension cause occurs. The suspension cause is the "cache miss".

Here, although the scheduling control unit 1100 tries to select the task "T0" executed immediately previously, a status shown by the program status information 1914 of the program with the program ID 1911 "P0" is "being suspended". Therefore, the scheduling control unit 1100 tries to select a next task "T2".

Although a status shown by the program status information 1914 of the program "P2" assigned to the task "T2" is "waiting for execution", the suspension cause "cache miss" of the suspension cause information 1912 shows "YES". Therefore, the scheduling control unit 1100 does not select the task "T2", and tries to select the task "T3".

Regarding the task "T3", a status shown by the program status information 1914 corresponding to the program "P3" is "waiting for execution", and the suspension cause "cache miss" of the suspension cause information 1912 shows "NO".

Therefore, the scheduling control unit 1100 selects the task "T3" as a task to be executed next.

In a time slice 602, the task "T3" is executed in advance. At this time, since the scheduling control unit 1100 judges whether the same suspension cause occurs in the program to be executed, some performance deterioration 690 occurs. However, this ensures that the same suspension cause will not occur. In other words, since the task "T3" is executed here, a suspension cause is avoided that would overlappingly occur, following the suspension cause occurred in the task "T1" if the task "T2" were executed.

Subsequently, an execution time period allotted to the task "T3" being executed in the time slice 602 ends, and the task "T2" is executed in a time slice 603. A suspension cause occurs in the task "T2" being executed, and therefore the execution of the task "T2" is suspended. In a time slice 604 subsequent to the time slice 603, the task "T3" executed immediately previously is executed.

Second Modification Example

<Outline>

In a second modification example, if a suspension cause occurs, the scheduling control unit 1100 judges whether to switch between tasks depending on a time period required for resolving the suspension cause.

In the second modification example, two cases are described.

In a first case, in a case where a suspension cause is resolved before an execution of a next task starts, no task is executed until the occurred suspension cause is resolved.

In a second case, in a case where it is expected that resolution of a suspension cause needs a time period, if same suspension causes overlappingly occur in succession, a clock is not supplied until the suspension cause occurred firstly is resolved, in order to suppress the electrical power consumption.

The following is common in the two cases. That is, if a suspension cause occurs while a task is being executed, a task executed immediately previously is not executed without condition. Instead of this, the execution of the task can be suspended under a predetermined condition.

<Operations>

Figure 18:
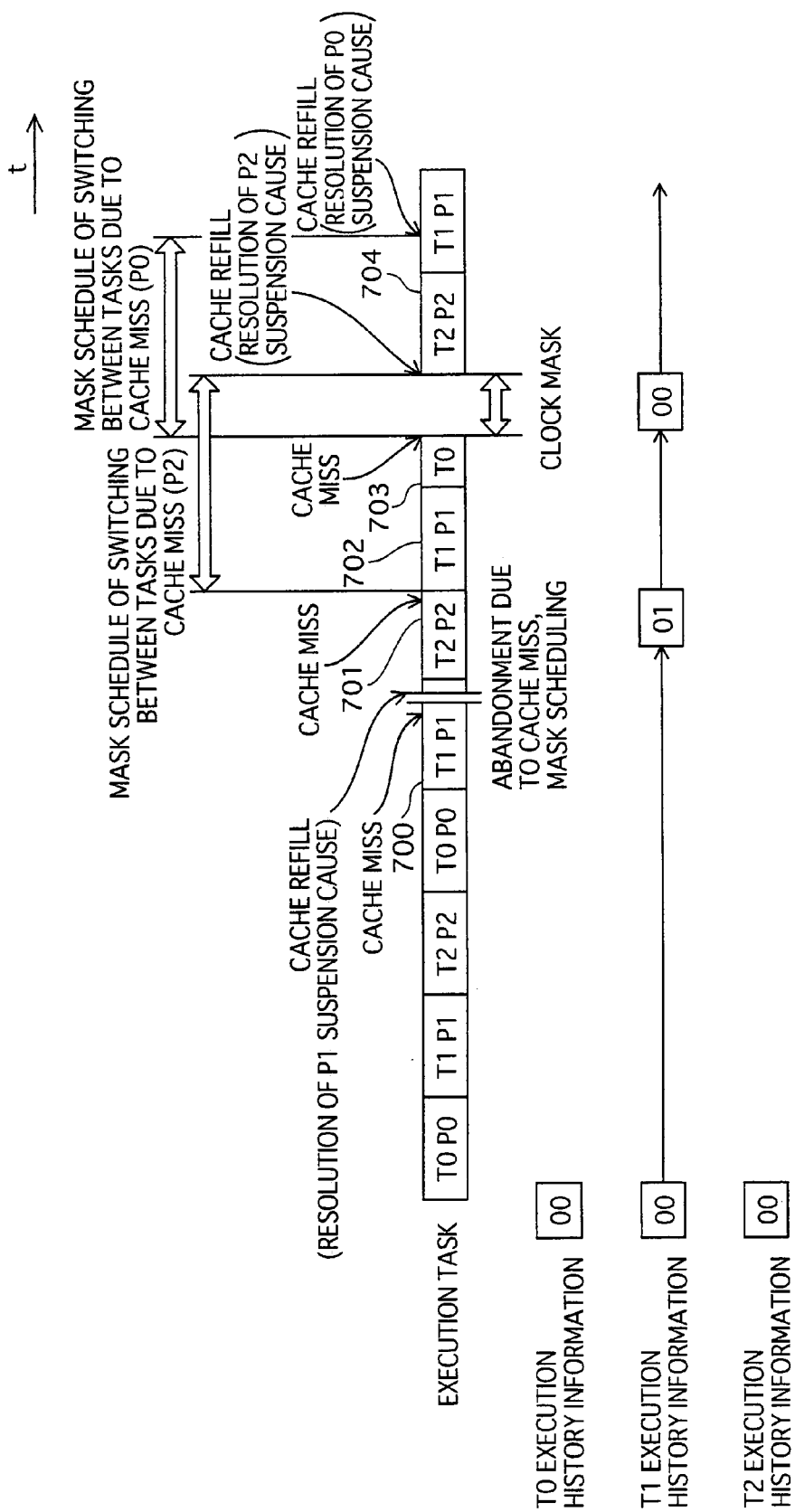
FIG. 18 shows a transition of an execution task in a case where a suspension cause whose type is the same as that occurred in the task having been executed occurs.

An example where an occurred suspension cause is waited for to be resolved is described using the transition diagram shown in FIG. 18 and the program information 1910 shown in FIG. 6.

FIG. 18 shows a transition of an execution task in the case where a suspension cause occurs in the task having been executed.

Firstly, the first case is described.

If a suspension cause occurs in the task "T1" being executed in a time slice 700, the scheduling control unit 1100 refers to a time period shown by the resolution time information 1913 of the program "P1" assigned to the task "T1". In this example, if the suspension cause is the "cache miss", the resolution time period for the "cache miss" is "100".

If the scheduling control unit 1100 judges that a time when the occurred suspension cause is resolved is earlier than a time when an execution of a next task starts by switching between the registers, the scheduling control unit 1100 suspends the execution of the task until the suspension cause is resolved. Note that the time when the occurred suspension cause is resolved is a time when the resolution time period elapses since the suspension cause occurs.

In FIG. 18, the scheduling control unit 1100 judges, with respect to the suspension cause occurred in the task "T1" being executed in the time slice 700, that the time when the suspension cause is resolved precedes the time when the execution of the next task starts, and therefore the execution of the task is being suspended.

Subsequently, the second case is described.

A first suspension cause "cache miss" occurs in the task "T2" being executed in a time slice 701. At this time, the scheduling control unit 1100 executes next the task "T1" executed immediately previously in the time slice 701.

Also, the scheduling control unit 1100 refers to the resolution time information 1913 of the program information 1910, and acquires a time period needed for resolution of the first suspension cause. If the acquired time period is no less than a predetermined time period, the scheduling control unit 1100 masks the schedule so as to avoid processing a suspension cause due to the same suspension cause, i.e., a second "cache miss". That is, although the scheduling control unit 1100 receives a notification of the occurrence of the same suspension cause from the program execution control unit 1200, the scheduling control unit 1100 does not execute a task executed immediately previously whose context remains in the standby register.

The task "T1" is executed in a time slice 702, and the task "T0" is executed in a time slice 703. If the second "cache miss" occurs while the task "T0" is being executed, the scheduling control unit 1100 stops supplying clocks to the units except for the scheduling control unit 1100 until the first "cache miss" is resolved because the schedule is masked.

And then, if the first "cache miss" is resolved, the scheduling control unit 1100 starts supplying clocks, and performs task switching processing due to the second "cache miss". In the task switching processing, a value shown by the execution history information 1822 of the task "T1" is updated to "00".

In a next time slice 704, the scheduling control unit 1100 restarts executing the task "T2" selected in the task switching processing. The second "cache miss" has not been resolved yet at this time. Therefore, the scheduling control unit 1100 masks the scheduling so as to avoid processing a "cache miss" even if it occurs again.

However, even if the first "cache miss" has not been resolved yet after a time period shown by the resolution time information 1913 of the first "cache miss" passes over, task switching processing is performed after the passing of the time period. In this task switching processing, the value shown by the execution history information 1822 of the task "T1" is updated to "10".

In the next time slice 704, the scheduling control unit 1100 restarts executing the task "T2" selected in the task switching processing. The second "cache miss" has not been resolved yet at this time. Therefore, the scheduling control unit 1100 masks the schedule so as to avoid processing a "cache miss" even if it occurs again.

These processing in the first and second modification examples is additionally performed in the next task selection processing (FIG. 9 and FIG. 12).

<Supplementary Description>

Although the processor according to the present invention has been described based on the embodiment, the processor can be partially modified and the present invention is not of course limited to the embodiment. The following are also employed.

(1) In the embodiment, the number of tasks to be executed in the pseudo-parallel manner is three or four. However, the number of the tasks may be greater than four.

(2) In the embodiment, the supply of clocks to the units other than the scheduling control unit 1100 is stopped. However, the supply to the other units may be stopped. For example, the supply of clocks to units other than a part for controlling clocks included in the scheduling control unit 1100 may be stopped.

(3) In the embodiment, two register groups are used. However, no less than three register groups may be used.

In this case, if execution of a task being executed is suspended, the scheduling control unit 1100 executes a task using a context remaining in a register group other than a register group used for executing the task whose execution is being suspended. In other words, in the embodiment, if a context of a task executed previously remains in a standby register that is a register group to be used next, the task is executed using the remaining context. However, in a case where a plurality of register groups are used for task execution, if a context remains in the register groups executed previously, a task is executed using one of these register groups (See FIG. 8, etc.).

A specific example is described using FIG. 2. In this example, two register groups the REG1 and the REG2 are used. However, the example is described on the supposition that an REG3 is also used.

In the time slice 131, while the task B is being executed using the REG2, the task C is restored not into the REG1 but into REG3 and execution of the task C next to the task B is prepared. The context of the task A remains in the REG1.

In this case, if, at a time 22 that is earlier than a restoration of the task C starts while the task B is being executed, a suspension cause occurs and therefore the execution of the task B is suspended, the task A whose context remains in the REG1 can be executed. The task C is restored into the REG3 as scheduled.

However, if the scheduling control unit 1100 tries to restore the task C not into the REG3 but into the REG1, the scheduling control unit 1100 does not restore the task C and executes the task A whose context remains in the REG1.

INDUSTRIAL APPLICABILITY

In a processor having a single program execution mechanism using a plurality of registers that cyclically execute a plurality of tasks, in a case where when a task being executed is unscheduledly suspended, the present invention is especially useful in continuing the processing.

The invention claimed is:

1. A processor that cyclically executes a plurality of tasks in accordance with an execution time period allotted to each of the tasks, the processor comprising:
a storage unit operable to store pieces of execution control information respectively corresponding to each of the tasks;
a plurality of register groups;
an execution unit operable to sequentially use one of the register groups to execute a task based on the execution control information held in the register group being used;
a selection unit operable to select a next task to be executed among the tasks;
a restoration unit operable to, while a current task is being executed for an execution time period allotted thereto, restore a piece of the execution control information corresponding to the next task from the storage unit into one of the register groups other than the register group being used by the current task;
a detection unit operable to detect a suspension cause for the current task being executed; and
a control unit operable to, (i) if the suspension cause is detected before the restoration starts, have the execution unit suspend the execution of the current task and execute a previous unfinished task based on a piece of the execution control information held in one of the register groups other than the register group having been used for the execution of the current task, and (ii) if the register group holding the piece of the execution control information corresponding to the previous unfinished task is the register group the restoration into which is to be started, have the restoration unit cancel the restoration.

2. The processor of claim 1 wherein
the storage unit further stores pieces of time information each showing a time period until a suspension cause that occurs while each of the tasks is being executed is resolved, and
only if the suspension cause is detected before the restoration completes and the control unit judges that the suspension cause is resolved after the restoration completes based on a corresponding piece of the time information,
the control unit has the execution unit suspend the execution and execute one of the tasks based on a piece of the execution control information held in one of the register groups other than the register group having been used for the execution.

3. The processor of claim 1, wherein
the storage unit further stores pieces of information each relating to a suspension cause that might occur while each of the tasks is being executed,
the detection unit detects a plurality of types of suspension causes,
if the control unit has the execution unit suspend an execution of one of the tasks based on a detected suspension cause, the selection unit selects another one of the tasks in which a suspension cause whose type is the same as the detected suspension cause does not occur with reference to a corresponding piece of the stored information relating to the suspension cause.

4. The processor of claim 1 further comprising
a resolution detection unit operable to detect a resolution of the suspension cause, wherein
the detection unit detects a plurality of types of suspension causes, and
if (i) after the execution of the task having been executed is suspended by the detected suspension cause, another one of the tasks is being executed, and (ii) another one suspension cause whose type is the same as the detected suspension cause is detected before the resolution of the suspension cause is detected,
the control unit has the execution unit suspend the execution of the another one of the tasks and execute no task until the resolution is detected.

* * * * *